J. K. STEWART.
SHAFT SPEED INDICATOR FOR CREAM SEPARATORS AND THE LIKE.
APPLICATION FILED JAN. 20, 1913.
1,083,638.
Patented Jan. 6, 1914.
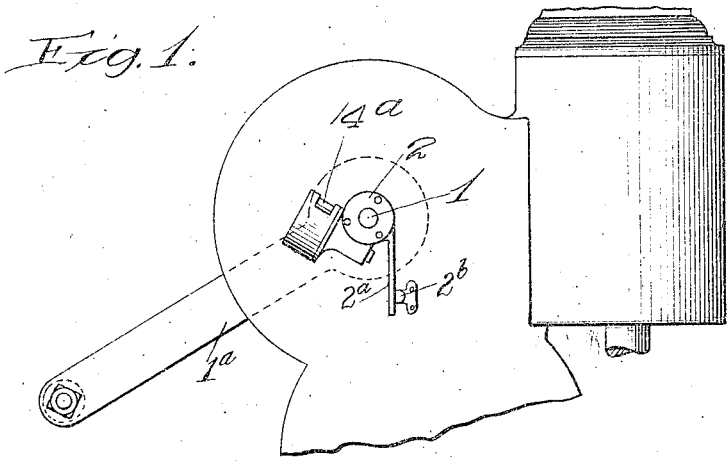
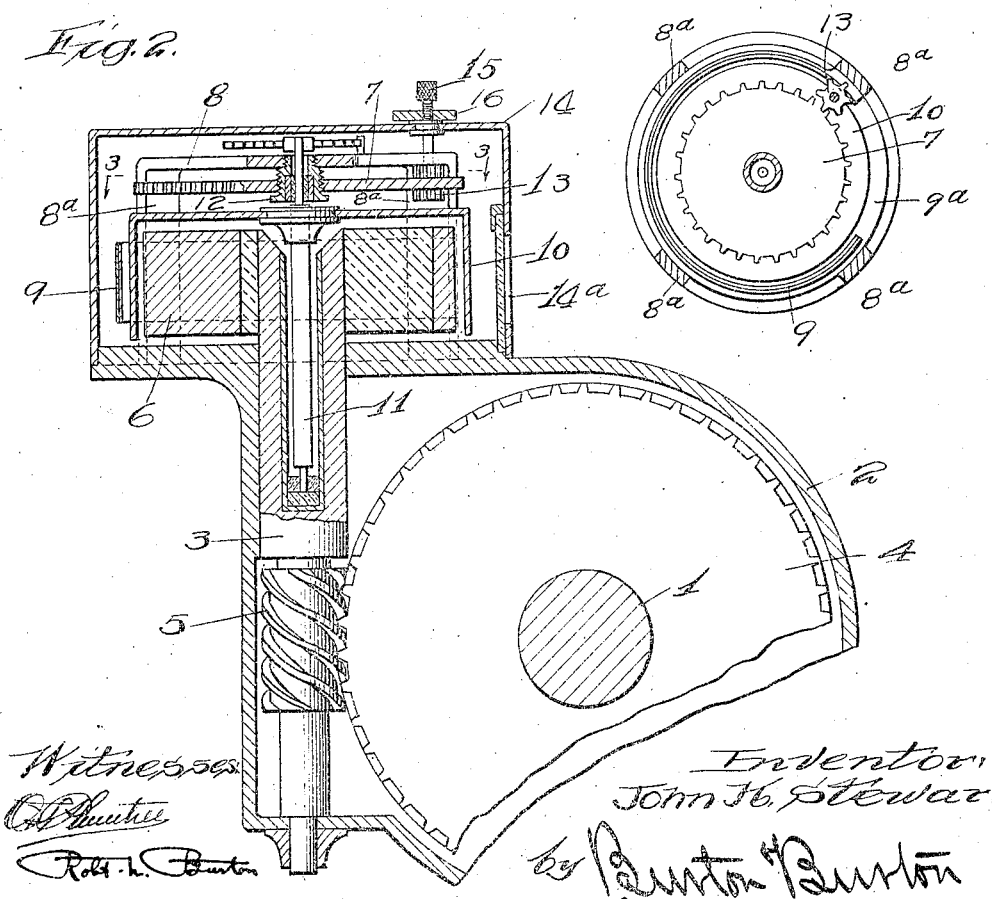

UNITED STATES PATENT OFFICE.

JOHN K. STEWART, OF CHICAGO, ILLINOIS, ASSIGNOR TO STEWART-WARNER SPEED-OMETER CORPORATION, OF CHICAGO, ILLINOIS, A CORPORATION OF VIRGINIA.

SHAFT-SPEED INDICATOR FOR CREAM-SEPARATORS AND THE LIKE.

1,083,638.  Specification of Letters Patent.  Patented Jan. 6, 1914.

Application filed January 20, 1913. Serial No. 743,040.

*To all whom it may concern:*

Be it known that I, JOHN K. STEWART, a citizen of the United States, residing at Chicago, in the county of Cook and State of Illinois, have invented new and useful Improvements in Shaft-Speed Indicators for Cream-Separators and the like, of which the following is a specification, reference being had to the accompanying drawings, forming a part thereof.

The purpose of this invention is to provide an improved device for indicating the speed of a rotating shaft particularly adapted for mounting and use on the prime shaft of a cream separator or other mechanism adapted to have its prime shaft operated by hand at a comparatively slow speed.

It consists in the elements and features of construction shown and described as indicated in the claims.

In the drawings: Figure 1 is a front elevation of a portion of a cream separator having its prime shaft equipped with a speed indicator embodying this invention. Fig. 2 is a section at the line, 2—2, on Fig. 1. Fig. 3 is a section at the line, 3—3, on Fig. 2.

In the structure shown in the drawings, 1 is the prime shaft of a cream separator or like mechanism whose speed is to be indicated. For the purpose of this invention this prime shaft is allowed to protrude from its bearings sufficiently to carry on the protruding end the speed indicator whose casing comprises a bearing, 2, by which it is supported directly on the protruding end of said shaft, 1, on which the casing is pivotally hung. On the shaft within the bearing there is rigidly secured a worm gear, 4, which meshes with a worm shaft, 5, whose worm thread has a pitch of about 45 degrees or more so that the shaft is readily rotated by the gear and consequently at a high speed relatively to that of the gear. With this construction the worm shaft may easily be given ten revolutions to one revolution of the prime shaft. The worm shaft, 5, carries an annular magnet, 6, whose rotation with the shaft produces a rotating magnetic field which is modified in form and concentrated by two devices, the first being a flat field plate, 7, mounted transversely to the axis of the magnet shaft on a cage or frame, 8, which is supported rigidly within the casing, as by means of four legs or arms, 8ª, disposed in a circle about the axis of the shaft, 5, at a little distance outside the circumference of the magnet. The other device for intensifying and modifying the form of the magnetic field is a split ring, 9, having an opening, 9ª, at one side, and which encompasses the magnet within the legs or arms, 8ª, except as to the opening, 9ª, which is provided for a purpose hereinafter explained. In the magnetic field formed between the circumference of the magnet and the encompassing ring, 9, and between the top or end of the magnet and the flat plate, 7, there is positioned a cupped or flanged drag element, 10, being of electrically conductive and non-magnetic element, as of aluminum. This drag element is fixed upon a spindle, 11, which is stepped in the shaft, 3, the latter being axially bored to admit the spindle to its step bearing therein, a second bearing for the spindle being obtained on the top or front of the plate 7. The apertured ring, 9, is bi-metallic, composed of two laminæ, the inner lamina being of soft iron or steel to influence the form of the magnetic field, and the outer lamina being of a metal having a higher coefficient of expansion than iron or steel, brass or copper being suitable. This bi-metallic open ring is secured at one end rigidly to one of the legs, 8ª, of the cage, 8, so that upon change of temperature it is caused by the difference of expansion of its two laminæ to contract or expand radially,—contraction resulting from increase of temperature because the outer lamina has the greater co-efficient of expansion.

The change in the width of the annular space between the magnet and the field ring caused by change of temperature tends to compensate for errors in the indication which would otherwise result from change of temperature affecting the electric conductivity of the drag element, 10, according to a principle understood. The field plate, 7, is mounted for adjustment along the axis of the magnet for the purpose of calibrating the instrument. The means by which it is mounted for such adjustment consists of a hub or boss, 12, which is preferably formed as a separate piece from the cage 8 and exteriorly threaded for having the plate which is centrally apertured and threaded at its aperture screwed onto it, after which the boss is secured to the cage at the center of its top or front plate. This boss also carries the upper bearing above mentioned for the spindle, 11. The plate, 7, is peripherally toothed, thereby becoming a spur gear; and on the cage there is journaled a pinion, 13, meshing with the peripheral teeth of said plate, 7, for rotating the latter to screw it axially along the boss, 12, toward and from the magnet. The pinion shaft extends up through the top of the cage and may protrude through the top or cover, of the casing, 14, and be exteriorly provided with a bur or thumb-head, 15, by which it may be rotated to adjust the plate, 7, in calibrating the instrument. If desired, a lock nut, 16, may be provided for securing the plate, 7, in adjusted position. As usual, the casing, 14, is formed with a window or reading opening, 14$^a$, coinciding or registering with the opening, 9$^a$, in the field ring, 9, so that the cylindrical flange of the drag element is visible through said openings. This drag element is exteriorly provided with a scale graduated in revolutions per minute, the graduations corresponding to the speed of the shaft when the instrument is properly calibrated. Preferably, in order to position the casing, 14, so that its window, 14$^a$, shall face the operator while rotating the shaft, 1, by hand (for which a crank arm, 1$^a$, is shown), and to prevent the natural tendency of said casing to hang directly below the shaft, said casing is provided with an arm, 2$^a$, which is stopped against a bracket, 2$^b$, which may be bolted on to the side of the standard of the machine.

I claim:—

1. In combination with a prime motor shaft, a speed indicator comprising speed responsive means and a casing therefor which is pivotally mounted on said shaft; a gear on said shaft within the casing; and driving means from the gear to the speed responsive means.

2. In combination with a prime motor shaft having a relatively slow speed and adapted to be directly rotated by hand; a speed indicator comprising a casing which is pivotally mounted on said slowly rotating shaft; a gear on said shaft within the casing; a magnet mounted for rotation in the casing, and means by which the gear rotates the magnet at multiplied speed; a field plate supported on the casing for movement toward and from the magnet, a biased drag element positioned in the field between the magnet and the field plate; speed indicating means carried by said biased element, and means for moving the field plate toward and from the magnet for calibrating the instrument, said means extending to the outside of the case for manual operation at will.

3. In combination with a prime motor shaft having a relatively slow speed and adapted to be manually rotated; a speed indicator comprising a casing which is pivotally mounted on said shaft; a worm gear on the shaft within the casing; a worm shaft journaled in the casing meshing with and driven by the worm gear; a magnet mounted on the worm shaft for rotation thereby; a field plate mounted in the casing for movement toward and from the magnet; a biased drag element positioned in the field between the magnet and the field plate; indicating means carried by said biased drag element, and means for adjusting the field plate toward and from the magnet extending to the outside of the case for manual operation at will.

4. In combination with a shaft whose speed is to be indicated; a speed indicator comprising a casing which is pivotally mounted on said shaft; a driving gear on said shaft within the casing; a driven shaft journaled in the casing; a magnet mounted thereon for rotation therewith, and means for communicating multiplied rotary movement from said gear to said magnet-carrying shaft; a field plate mounted on the casing opposite the magnet, the casing having a threaded boss and the field plate having a threaded aperture by which it is screwed on to the boss for so mounting it on the casing; a biased drag element positioned in the field between the magnet and the field plate, and indicating means carried by the said biased drag element, said field plate being gear-toothed; a pinion journaled in the casing meshing with the gear teeth of the field plate, and means extending outside the case for rotating the pinion to screw the field plate on the boss toward and from the magnet.

5. A speedometer comprising a casing, a magnet therein for rotation, and means for rotating it from the shaft whose speed is to be indicated, two field-forming devices of magnetic metal mounted adjacent to the magnet; a biased drag element mounted in the magnetic field between the magnet and said field-forming devices, one of said field-forming devices being comprised in a laminated bi-metallic element whose lamina have different co-efficients of expansion under change of temperature, whereby the form of said field-forming element is changed with change of temperature to compensate for temperature error in the readings of the instrument, the other of said field-forming devices being mounted for movement toward and from the magnet, and means for so moving it at will for calibrating the instrument.

6. A speedometer comprising, in combination with a casing, a magnet mounted therein for rotation, and means for rotating it from the shaft whose speed is to be indicated; two field-forming devices composed of magnetic metal mounted adjacent to the magnet; a biased drag element positioned in the field between the magnet and said field-forming devices, one of said field-forming devices being comprised in a split ring which encompasses the magnet and which consists of two laminæ which have different co-efficients of expansion under change of temperature, whereby the distance of said split ring from the magnet is changed by change of temperature altering its diameter, the other of said field-forming devices being a magnetic plate positioned transversely to the axis of the magnet, said plate being mounted in the casing for movement toward and from the magnet, and means extending outside the case for so moving it at will.

7. A speedometer comprising, in combination with the case, a magnet mounted therein for rotation and means for rotating it from the shaft whose speed is to be indicated; a calibrating plate of magnetic material; a threaded support on which it is centrally mounted in a plane tranverse to the axis of rotation of the magnet, and exteriorly accessible means for rotating the plate on its threaded support to move it toward and from the magnet.

8. A speedometer comprising, in combination with the case, a magnet mounted therein for rotation and means for rotating it from the shaft whose speed is to be indicated; a calibrating plate of magnetic material; a threaded support on which it is centrally mounted in a plane tranverse to the axis of rotation of the magnet, said plate being peripherally cogged, and a pinion journaled in the case engaging said cogged periphery, the pinion having its shaft extending outside the case and exteriorly provided with means for rotating the pinion to rotate the plate for moving it toward and from the magnet.

In testimony whereof I have hereunto set my hand at Chicago, Illinois, this 8th day of January, 1913.

JOHN K. STEWART.

Witnesses:
 STANHOPE HUDSON,
 C. B. SMITH.